UNITED STATES PATENT OFFICE.

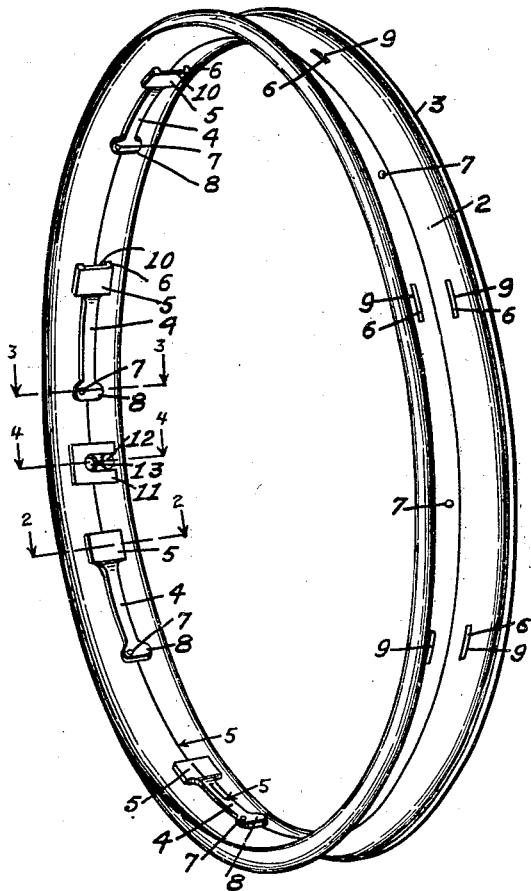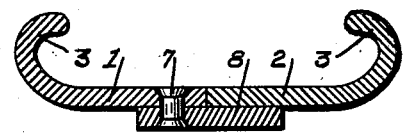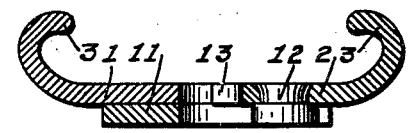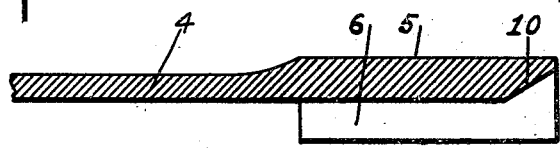

SCHUYLER C. EDDY, OF KALAMAZOO, MICHIGAN.

DEMOUNTABLE RIM.

1,266,003.   Specification of Letters Patent.   Patented May 14, 1918.

Application filed February 27, 1917. Serial No. 151,228.

*To all whom it may concern:*

Be it known that I, SCHUYLER C. EDDY, a citizen of the United States, residing at the city and county of Kalamazoo and State of Michigan, have invented certain new and useful Improvements in Demountable Rims, of which the following is a specification.

This invention relates to improvements in demountable rims.

The objects of this invention are:

First, to provide an improved separable demountable rim for automobile wheels to which the tire can be very quickly and easily attached and from which it can be removed without the necessity of any circumferential movement of the rim relative to the tire.

Second, to provide an improved separable demountable rim the parts of which can be separated and removed from the tire by simple axial movement of the rim members.

Third, to provide an improved separable demountable rim, removable from the tire by an axial movement of one of the rim members and provided with locking means for holding the rim members against axial and circumferential movement relative to each other, said locking means being of such a nature that they may be released to remove the tire from the rim without the need of special tire tools.

Fourth, to provide an improved separable demountable rim in which the rim may be removed from the tire by an axial movement of the rim members relative to each other, said rim members being held together by locking means, said locking means being so designed that the stress tending toward the axial separation of the rim members, when a tire is inflated on the rim, is taken up by the metal parts of the locking means and does not come on the rivets which secure the lockers to the rim member.

Further objects, and objects relating to details and economies of construction and operation will definitely appear from the detailed description to follow.

I accomplish the objects of my invention by the devices and means described in the following specification. The invention is clearly defined and pointed out in the claims.

A structure constituting a preferred embodiment of my invention is illustrated in the accompanying drawing forming a part of this specification, in which:

Figure I is a perspective view of a separable demountable rim constructed in accordance with my invention.

Fig. II is an enlarged detail sectional view on the line 2—2 of Fig. I showing in detail the head of the locker bar and its engagement with the two rim members.

Fig. III is an enlarged detail sectional view on the line 3—3 of Fig. I showing in detail the manner in which the locker bar is pivoted to the rim member.

Fig. IV is an enlarged detail sectional view on the line 4—4 of Fig. I showing in detail the guide means for use in assembling the parts of the rim in correct relation to each other and to the tire.

Fig. V is an enlarged detail longitudinal sectional view on the line 5—5 of Fig. I, showing in further detail the construction of the locker bar.

In the drawings, similar reference characters refer to similar parts throughout the several views and the sectional views are taken looking in the direction of the little arrows at the ends of the section lines.

My improved separable demountable rim is adapted to be secured to the felly of an automobile wheel by means of wedges or in any other suitable manner. I have not illustrated here the means by which this demountable rim is secured to the automobile wheel as this forms no part of my invention and is well understood in the art.

Considering the numbered parts of the drawing, my rim comprises a pair of annular rim members 1 and 2, each of said rim members having a channel flange 3 at one edge thereof, for engaging the bead of the tire in a manner which is well understood in the art. The inner edges of the rim members 1 and 2 are smooth and lie in engagement with each other. These rim members may be formed, if so desired, by splitting an ordinary demountable rim longitudinally into two parts. A plurality of slots 9 are formed in the rim members 1 and 2, a short distance from the inner edges thereof and these slots are so disposed that when the rim members are assembled in proper relation to each other, these slots will be disposed in pairs, a slot in one rim member being opposite to a slot in the other rim member. Any number of pairs of slots may be provided, eight of them being shown in the present embodiment of my invention. There is provided a locker bar 4 for each pair of slots 9, eight locker bars being shown in the present embodiment, each locker bar being formed of spring material and provided with a head 5 slightly thicker than the body of the locker bar and having a pair of parallel downwardly extending lugs 6, 6 disposed at such a distance apart as to engage in slots 9 when the rim members are assembled together. The locker bars are riveted to one of the rim members by a rivet 7 disposed through the tail 8 of the locker bar. The forward end of the locker bar head 5 is undercut as at 10 to facilitate the insertion of a screw driver or other tool in order to spring back the head of the locker bar to remove the lugs 6 from the slots 9 when it is desired to remove a tire from the rim.

A valve stem hole 13 is provided, half of said hole being formed in each of the rim members and, in order to facilitate the assembling of the rim members 1 and 2 in the proper relation to each other so that the halves of the valve stem hole are in line, a block 11 is secured to the rim 1, said block projecting over the rim member 2 and being provided with a notched portion in which a pin 12 carried by the rim member 2 is disposed.

In Fig. I, the rim members 1 and 2 are shown connected together so as to form a complete demountable rim. When it is desired to secure a tire to said rim, a screw driver or other suitable instrument is inserted beneath the under cut head 10 of each of the locker bars 4 and the heads 5 of said locker bars 4 are pried up so as to remove the lugs 6 from the corresponding slots 9 and the locker bars are then swung on the pivots 7 to one side so as to prevent the lugs 6 from springing back into the slots 9. The rim members 1 and 2 can be separated by straight axial movement of one rim member relative to the other, this being a very simple operation. The tire is placed with one bead in engagement with the channel flange 3 of the rim member 2 and the valve stem disposed in the half of the valve stem hole 13, channel flange 3 of the rim member 1 is placed in engagement with the other bead of the tire, the rim members being brought into alinement with each other so that the block 11 engages the pin 12 on the rim member 2, the rim member 1 is forced toward the rim member 2 until their inner edges are in engagement and the rim members are then secured together by turning the locker bars 4 on their pivots until the lugs 6 are in line with the slots 9 when the spring of the locker bars 4 will cause them to snap into place with lugs 6 engaging in the slots 9, locking the rim members against both axial and circumferential movement relative to each other. The spring of the locker bars 4 prevents the lugs 6 moving out of the slots 9 as will be readily seen.

When the tire has been on a demountable rim for some time, it becomes set relative to the rim and it is a matter of considerable difficulty to move one of the rim members circumferentially relative to the bead of the tire and for this reason a separable rim in which a circumferential movement of one of the rim members is necessary before the rim can be moved from the tire, is objectionable, since it is a very difficult matter to remove the rim from the tire. In my improved demountable rim, all that needs to be done to remove the rim from the tire is to snap back the locker heads, bring the lugs 6 out of engagement with the slots 9 and the rim can be removed from the tire by moving one of the rim members axially straight away from the bead of the tire without any circumferential movement of the rim member relative to the bead.

It is customary when carrying spare tires and rims to provide a demountable rim to which a tire is secured, the tire being carried upon the rim in an inflated condition. When a tire is inflated to from 75 to 80 pounds pressure, quite a considerable stress is exerted upon the channel flanges 3 tending toward the axial separation of the two rim members 1 and 2. In my improved rim all of this stress is taken by the locker head 5 and as this is of very tough spring metal, these parts may be drop forged, all of this stress very easily taken care of, making a very strong and durable structure. None of this stress comes upon the rivets 7 and there is no danger of these rivets being sheared by the stress. As stated, these lockers may be drop forged, it simply being necessary to provide sufficient spring to permit of the head 5 snapping back far enough to remove the lugs 6.

I am aware that the particular embodiment of my invention which I have here shown is susceptible of considerable variation without departing from the spirit of my invention and therefore, I do not wish to be restricted to the same. I have found, however, that this form is to be preferred, and therefore, I desire to claim the same specifically as well as broadly as indicated by my appended claims.

Having thus described my invention, what I claim as new and desire to secure by Letters Patent is:

1. In a separable demountable rim, the combination of a pair of annular rim members, the inner edges of said rim members lying in engagement with each other, said rim members being provided with a plurality of slots disposed in pairs with a slot in one rim member in line with a slot in the other rim member; a plurality of locker bars of spring metal, each of said bars being pivoted to the inner face of one of said rim members, each of said locker bars being provided with a head having downwardly extending lugs adapted to engage in said slots, the end of each head being under cut; said rim members being provided with semicircular notches forming a valve stem hole when the rim members are assembled in proper relation; a pin secured to one of said rim members in line with said notch; and a block secured to the other rim member in line with the notches and provided with a notched portion adapted to receive said pin; all coacting substantially as described and for the purpose specified.

2. In a separable demountable rim, the combination of a pair of annular rim members, the inner edges of said rim members being provided with a plurality of slots disposed in pairs with a slot in one rim member in line with a slot in the other rim member; a plurality of locker bars of spring metal, each of said bars being pivoted to the inner face of one of said rim members, each of said locker bars being provided with a head having downwardly extending lugs adapted to engage in said slots, the end of each head being undercut; a pin secured to one of said rim members; and a block secured to the other rim member and provided with a notched portion adapted to receive said pin; all coacting substantially as described and for the purpose specified.

3. In a separable demountable rim, the combination of a pair of annular rim members, the inner edges of said rim members lying in engagement with each other, said rim members being provided with a plurality of slots disposed in pairs with a slot in one rim member in line with a slot in the other rim member; a plurality of locker bars of spring metal, each of said bars being pivoted to the inner face of one of said rim members, each of said locker bars being provided with a head having downwardly extending lugs adapted to engage in said slots, the end of each head being undercut; all coacting substantially as described and for the purpose specified.

4. In a separable demountable rim, the combination of a pair of annular rim members, the inner edges of said rim members lying in engagement with each other, said rim members being provided with a plurality of slots disposed in pairs with a slot in one rim member in line with a slot in the other rim member; a plurality of locker bars of spring metal, each of said bars being pivoted to the inner face of one of said rim members, each of said locker bars being provided with a head having downwardly extending lugs adapted to engage in said slots; all coacting substantially as described and for the purpose specified.

5. In a separable demountable rim, the combination of a pair of annular rim members, said rim members being provided with a plurality of slots disposed in pairs with a slot in one rim member in line with a slot in the other rim member; a plurality of spring metal locker bars, each of said bars being pivotally carried by one or the other of said rim members and having a head provided with means engaging in said slots to hold the rim members against axial and circumferential movement relative to each other; all coacting substantially as described and for the purpose specified.

In witness whereof, I have hereunto set my hand and seal in the presence of two witnesses.

SCHUYLER C. EDDY. [L. S.]

Witnesses:
 LUELLA G. GREENFIELD,
 ANNIE E. PARRY.

Copies of this patent may be obtained for five cents each, by addressing the "Commissioner of Patents, Washington, D. C."